US006331938B1

(12) United States Patent
Hsieh et al.

(10) Patent No.: US 6,331,938 B1
(45) Date of Patent: Dec. 18, 2001

(54) STRUCTURAL AND ELECTRICAL CONNECTIONS FOR STACKED COMPUTER DEVICES

(75) Inventors: Shyn-Tsong Hsieh, Taipei Hsien; Shyn-An Hsieh, Chiluang, both of (TW)

(73) Assignee: SURECOM Technology Corporation, Taipei Hsien (TW)

( * ) Notice: Subject to any disclaimer, the term of this patent is extended or adjusted under 35 U.S.C. 154(b) by 0 days.

(21) Appl. No.: 08/959,195

(22) Filed: Oct. 28, 1997

(51) Int. Cl.[7] ...................................................... H05K 7/20
(52) U.S. Cl. ........................... 361/735; 361/692; 439/735
(58) Field of Search ............................ 200/307; 361/600, 361/680, 683–685, 690, 692, 727, 729, 735, 744, 784, 785, 789, 790, 810; 439/735, 541.5, 620

(56) References Cited

U.S. PATENT DOCUMENTS 4,466,048 * 8/1984 Schwab ................................ 361/331
5,514,907 * 5/1996 Moshayedi ........................... 361/735
5,561,593 * 10/1996 Rotolante ............................. 361/735
5,575,686 * 11/1996 Nochese ............................... 439/620
5,612,854 * 3/1997 Wiscombe ........................... 361/727
5,778,522 * 7/1998 Burns .................................. 361/735
5,808,876 * 9/1998 Mullenbach ......................... 361/788

* cited by examiner

Primary Examiner—Gerald Tolin
(74) Attorney, Agent, or Firm—Dougherty & Troxell

(57) ABSTRACT

A computer device includes a case, a circuit board disposed in the case and connected with a power cord. The case has a hole group in a side for pins of a connect plate to be inserted and support the cases stacked up. The case is further provided with an upper hole and a lower hole in a corresponding location for a parallel pin receptacle to be inserted and pin sockets to fit in the pin receptacle to electrically connect the computer devices stacked up and supported with the connect plates.

11 Claims, 7 Drawing Sheets

STRUCTURAL AND ELECTRICAL CONNECTIONS FOR STACKED COMPUTER DEVICES

BACKGROUND OF THE INVENTION

This invention relates to a computer device, particularly to one applied to a computer network, having lower cost, electric features, convenient assembly, small dimensions after assembly, and reduced electric and magnetic interference to a large degree.

Stacking characteristics of computer devices can be divided into structural connections and an electric connections.

Nowadays, the structural stacking of the computer devices such as hubs 1 shown in FIG. 1, leaves little gaps making it hard for heat to disperse, as the hubs 1 are stacked up rather near to each other.

As seen from FIG. 1, conventional electrical connection of the hubs for computer devices is performed by lead wires 11 and two connecters 12 between the hubs 1, and through a parallel port such as RS232, SCS1, etc. on a circuit board.

However, electrical connection with the parallel port, lead wires and connecters may occupy comparatively large dimensions on the circuit board and at high cost. The diameter and gap of the pins of the connecter are rather small, easily causing electric and magnetic interference and bad transmission. To minimize electric and magnetic interference, covered components have to be used and the dimensions of the connecter will become larger, with lead wires becoming very complicated.

SUMMARY OF THE INVENTION

The main purpose of the invention is to offer a computer device of low cost, easy assemblage, easy stacking, good electric features, no electric and magnetic interference and small dimensions.

A feature of the invention is a connect plate having two sides provided with pins at an upper end and a lower end to fit tightly in pin holes in a same level provided in two sides of a computer device so as to support two of the computer devices.

Another feature of the invention is a power supplier independently provided to reduce magnetic interference inside the computer device, with engaging projections provided on a bottom side in the computer device and grooves provided in the power supplier to engage the engaging projections so as to permit the computer devices to be stacked.

One more feature of the invention is an upper hole and a lower hole provided in the computer device in the same location for a parallel pin receptacle to be inserted therein and a pin socket mounted on a circuit board for electrically connecting the stacked computer devices.

BRIEF DESCRIPTION OF THE DRAWINGS

This invention will be better understood by referring to the accompanying drawings, wherein.

DETAILED DESCRIPTION OF THE PREFERRED EMBODIMENT

Figure 1:
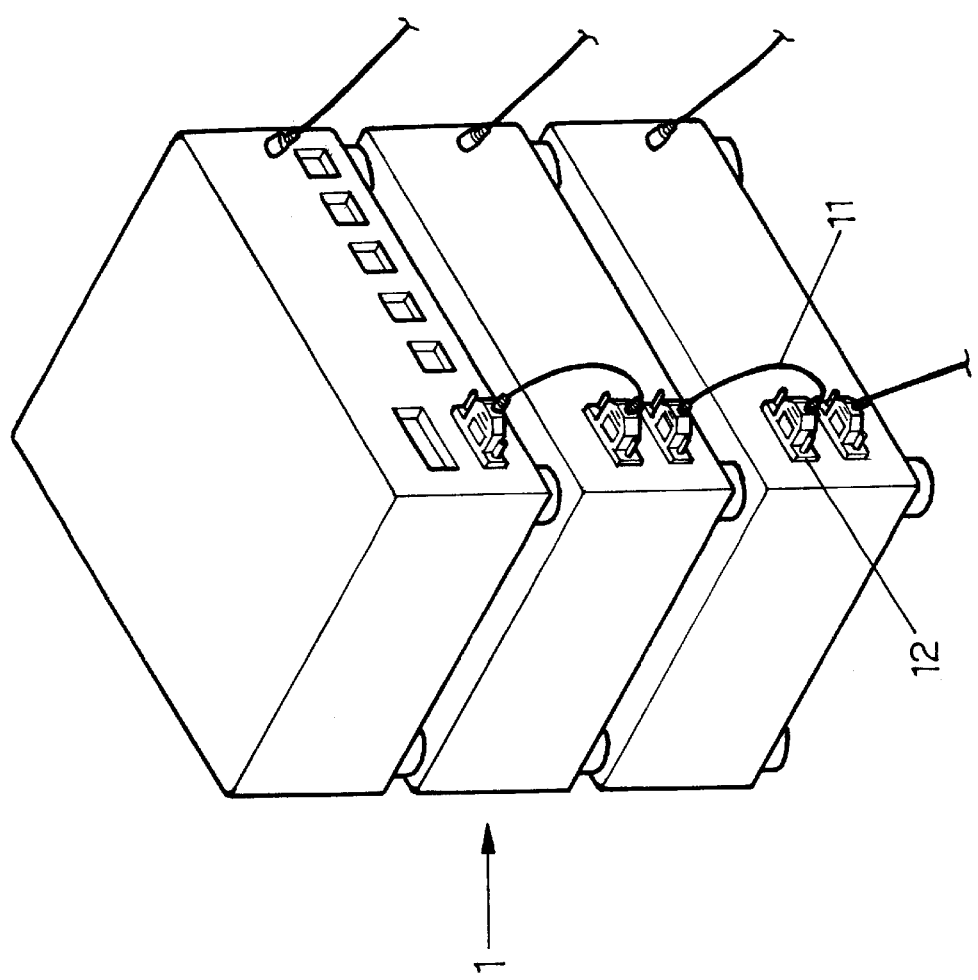
FIG. 1 is a perspective view of a conventional hub being in use.
Figure 2:
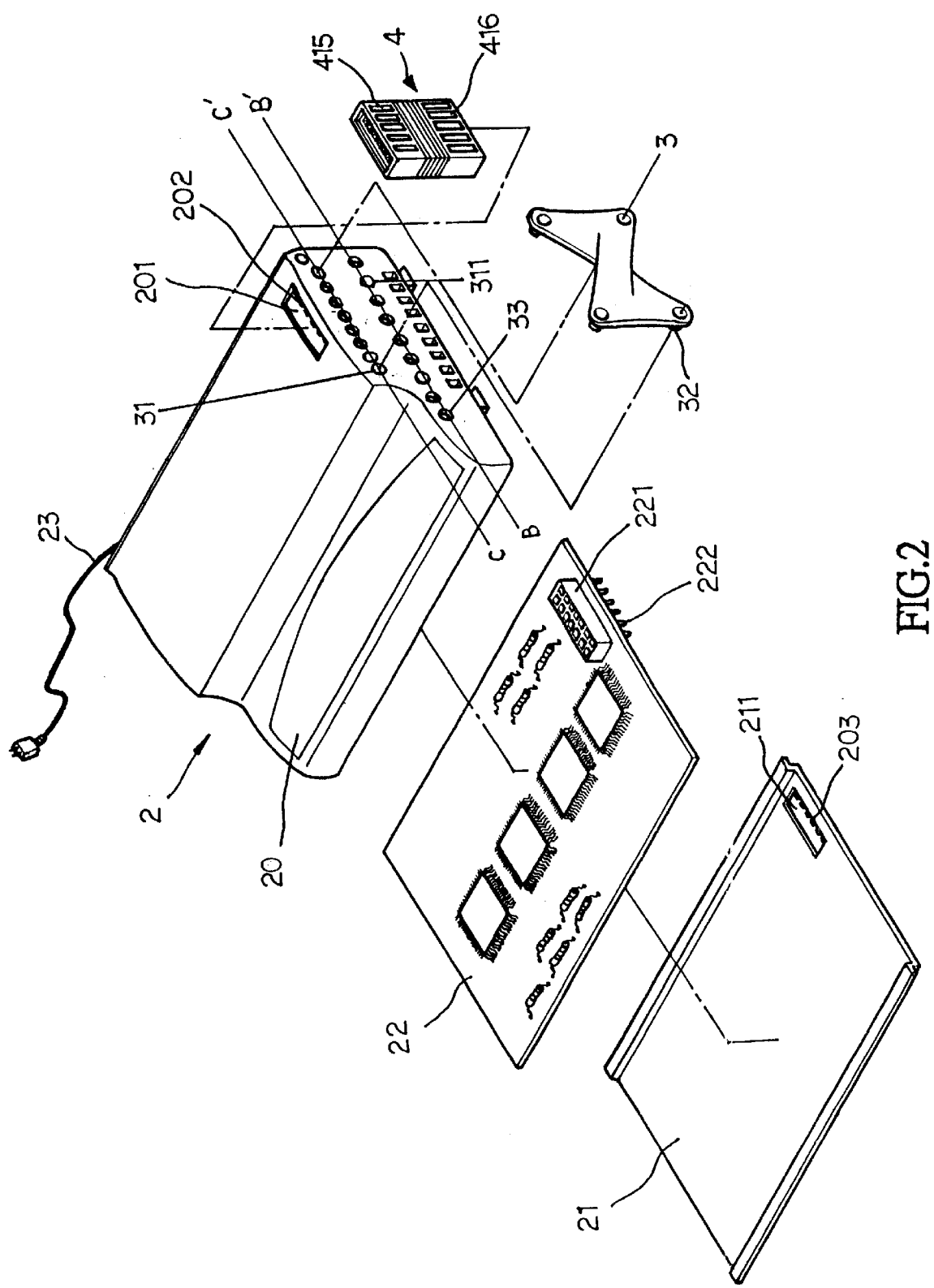
FIG. 2 is an exploded perspective view of a computer device in the present invention.

A preferred embodiment of an computer device in the present invention, as shown in FIG. 2, includes a case 2 of a generally sealed shape and contains a heat dispersing device at a proper location, and a circuit board 22 disposed in the case 2 and connected with a power cord 23.

In order to increase the convenience of being stacked up, the case 2 has a hole group 31 formed in a side for pins 32 fixed at an upper and a lower portion of two sides of a connect plate 3 to insert into the holes 311 of the hole group 31 of the cases 2. The connect plate 3 is H-shaped, having a plurality of pins 32 aligned in a side to correspond to the hole group 31 of the case 2.

Figure 3:
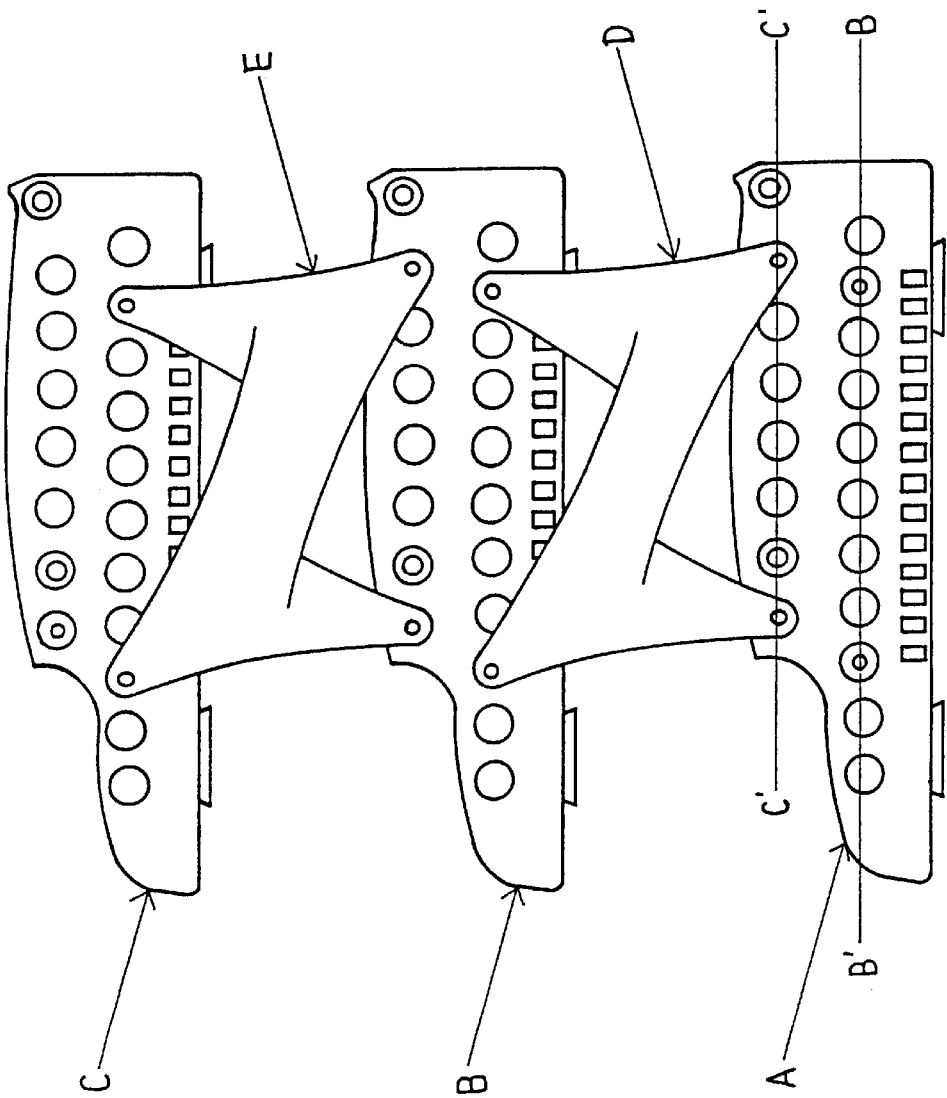
FIG. 3 is a perspective view of the computer device stacked up in the present invention.

The pin holes 311 are arranged into a first row (along line CC') located in an upper portion of a side of a case 2, and a second row (along line BB') below the first row. The first row of the pin holes 311 are for a connect plate 3 extending-up to connect and support a first case on a lower case. In the same manner, the second row of the pin holes 311 are for another connect plate 3 to be inserted therein. FIG. 3 illustrates the structural stacking of the computer devices. Firstly, the lower pins of a connect plate D are inserted in a first row of pin holes 311 of a case A, and then the upper pins of the connect plate D are inserted in a second row of insert holes of a case B. In the same fashion, the connect plate E and a case C are connected with each other. In this manner a plurality of the computer devices may be structurally stacked.

As for the heat dispersing, the case 2 has two opposite sides formed with a plurality of dispersing holes 33 of a different shape from the pin holes 311 (round in this embodiment), for preventing the pins 32 from being inserted in the dispersing holes 3.

The case 2 is generally made of an upper cover 20 and a bottom cover 21 as shown in FIG. 2, lowering the difficulty of design and manufacture to elevate the percentage of good quality.

Figure 8:
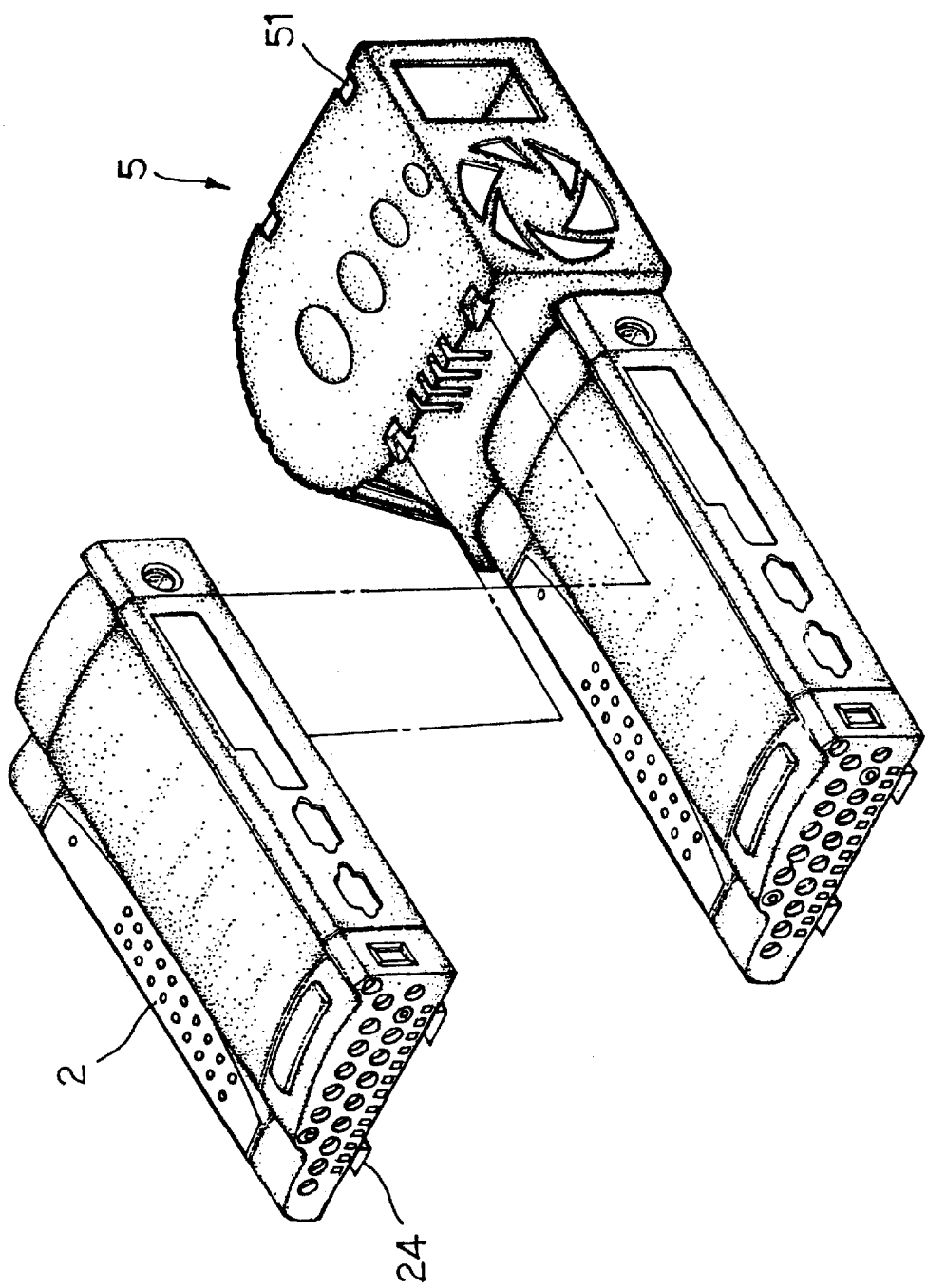

Next, as shown in FIG. 8, in order to reduce magnetic interference inside the computer device, its power is supplied with an independent power supplier 5. For attaining structural stacking of the power supplier 5 and the computer device, the case 2 has dove-tail projections 24 formed in a bottom side, and the power supplier 5 is formed with grooves 51 of the same shape as the dove-tail projections 24 for dove-tail projections 24 to fit therein so that the power suppliers 5 can be connected with and stacked up on the cases 2 one by one.

Figure 6:
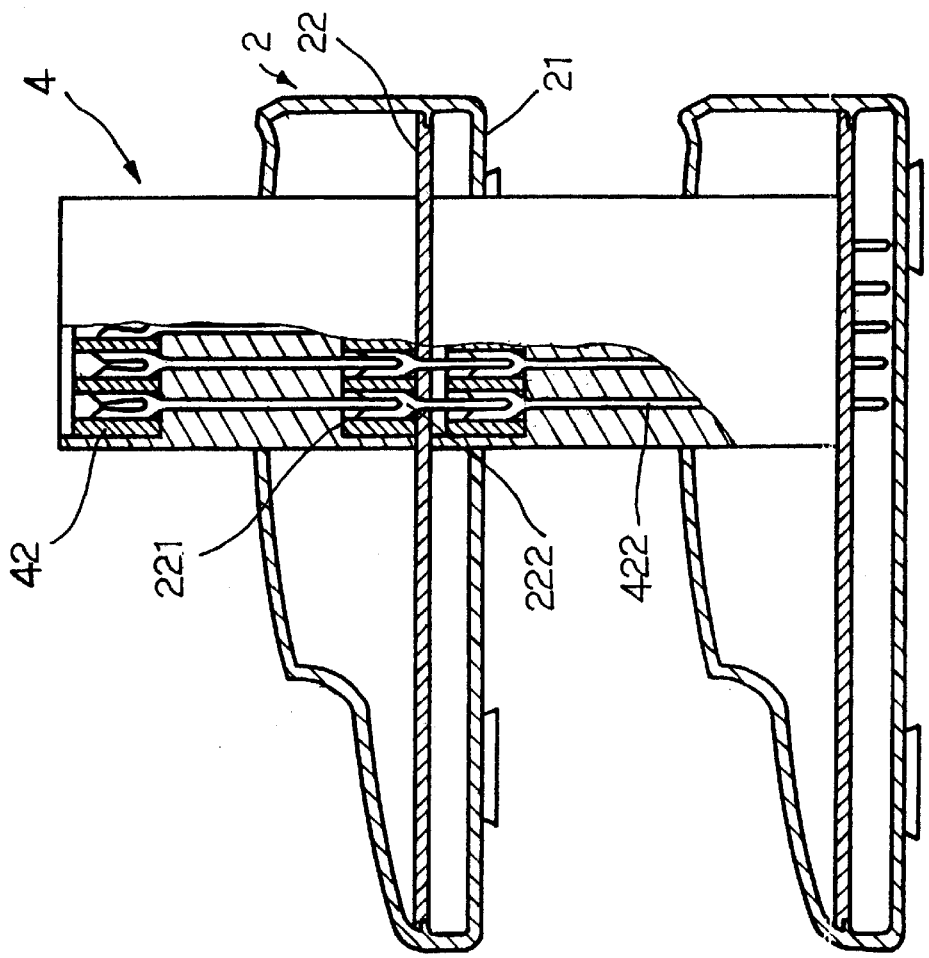
FIG. 6 is a cross-sectional view of two computer devices stacked up and electrically connected with the pin receptacles in the present invention.

As can be seen from FIGS. 4, 5, 6 and 7, to attain electric connection of the computer devices, the case 2 has an upper hole 201 and a lower hole 211 for a parallel pin receptacle 4 to pass through and insert in a pin socket 221 fixed on the circuit board 22. The pin socket 221 has a pin group 222 extending down and protruding through the circuit board 22, and another pin socket 42 formed on the top of the pin receptacle 221 for the pin group 222 of another circuit board 22 of another case 2 to engage with, as shown in FIG. 6, for electrically connecting more than two cases 2 with one another.

Figure 4B:
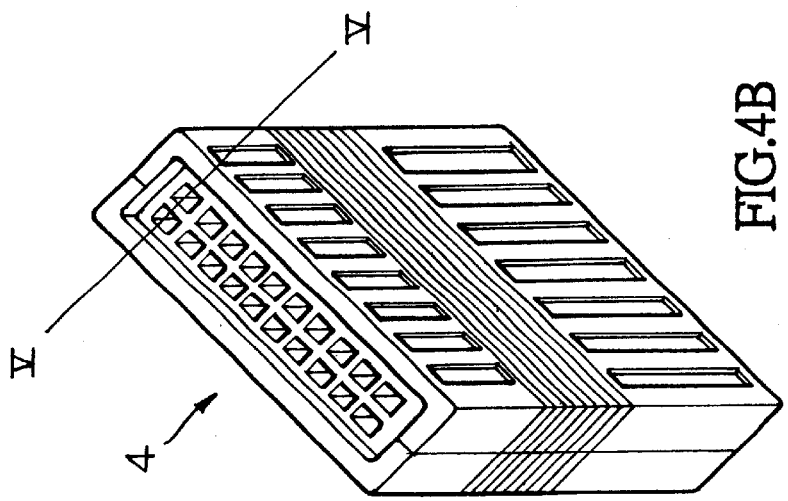
FIG. 4B is a perspective view of the pin receptacle of the present invention.
Figure 4A:
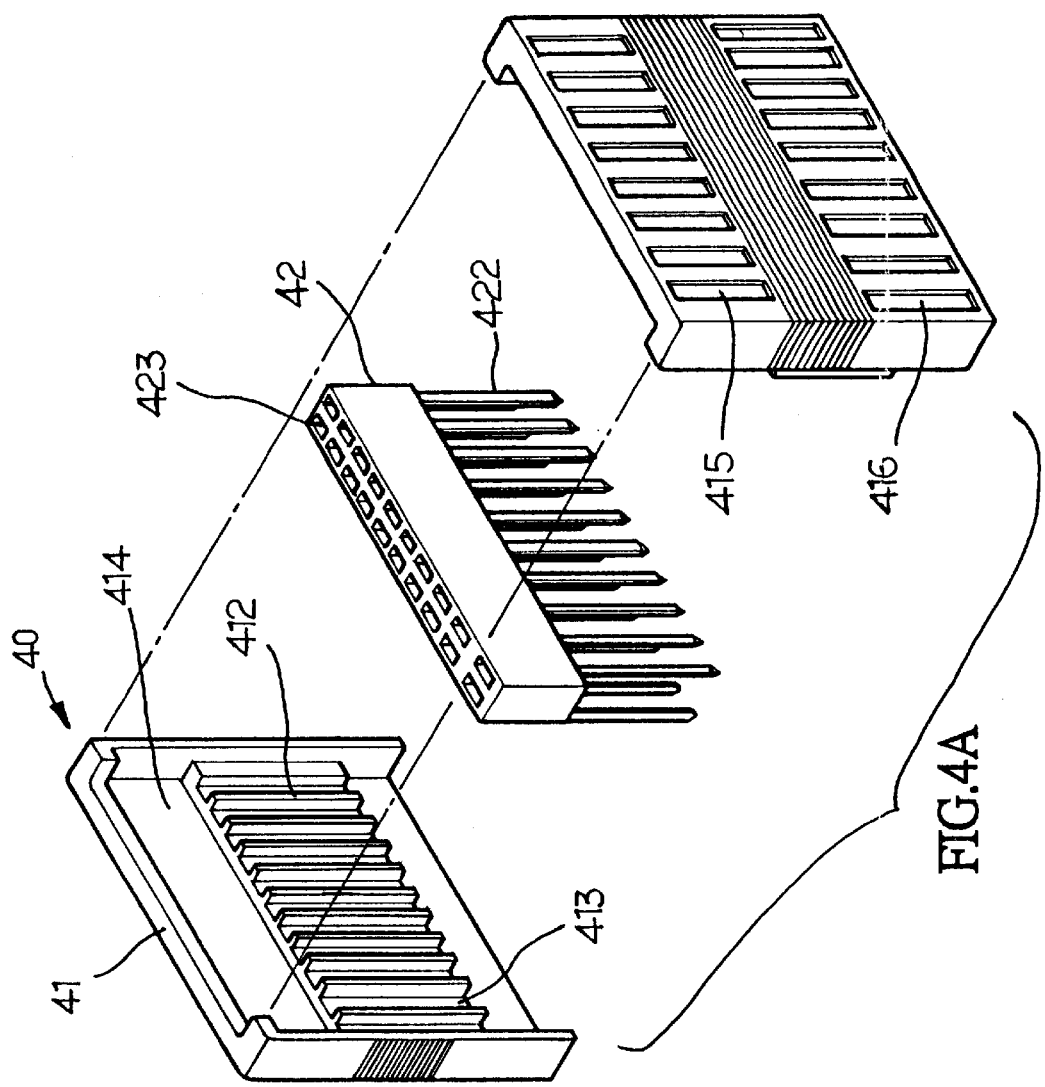
FIG. 4A is an exploded perspective view of a pin receptacle in the present invention.

The parallel pin receptacle 4 consists of a hollow case 40 and an elongate pin socket 42 inserted in the case 40, as shown in FIG. 4. Under the pin socket 42 are provided a plurality of pins 422 of a proper length and a comparatively large diameter and spaced apart with a rather large distance between. The pins 422 can serve to let the parallel pin receptacle 4 be inserted in the pin socket 221 of the circuit board 22, preventing signal interference from happening by means of the large distance between them. In addition, the pins 422 hardly bend or snap because of their large diameter so as to serve as conductors without fail. The pin socket 42 further has the same number of pin holes 423 formed in the corresponding locations in an upper portion as the pins 422 for the pin groups 222 of the pin socket 221 to insert therein. And at the same time, the outer surface of the case 40 is coated with a layer of electric lacquer to prevent electric and magnetic interference from happening against other computer devices.

As shown in FIG. 4, the hollow case 40 is made up of two U-shaped covers 41 fitted with each other, each U-shaped cover 41 having a plurality of vertical insulating strips 412 spaced apart equidistantly on an inner surface. After the two U-shaped covers 41 are fitted together to form a hollow case 40, the two rows of the vertical insulating strips 412 form a plurality of spaced holes 413 for the pins 422 to insert therein. A hollow space 414 is also formed on the insulating strips 412, for the pin socket 42 to fit therein.

Figure 5:
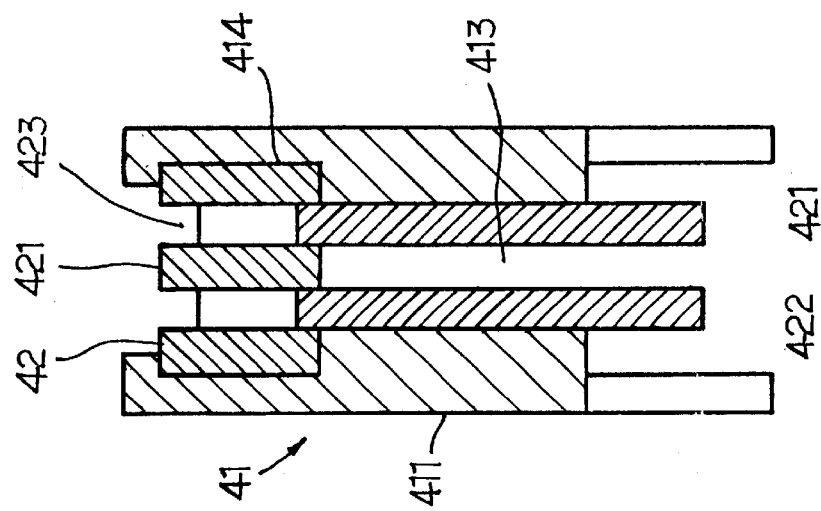
FIG. 5 is a cross-sectional view taken along line V—V in FIG. 4B.

FIG. 5 shows relative positions of parts of the parallel pin receptacle 4 after the receptacle 4 is combined together, with the pin socket 42 positioned in the hollow space 414, forming the parallel pin receptacle 4, and with the pins 422 extending down through the spaced holes 413 to insert in the pin socket 221 of the circuit board 22 to perform electric connection.

In order to avoid mistakes by a user in inserting the parallel pin receptacle 4, the hole 201 may be provided with a rack 202 on a side of the hole 201 to engage another rack 416 provided on a lower portion of a side of the parallel pin receptacle 4. In the same way, the lower hole 211 also has a rack 203 in a side to engage another rack 415 on an upper portion of a side of the parallel pin receptacle 4. Then a user can tell which racks to use for connecting different components.

In electrically connecting the computer devices, referring to FIG. 6, the parallel pin receptacle 4 is inserted in the upper hole 201 of the case 2, with the pins 422 of the pin socket 42 inserting in the pin socket 221 on the circuit board 22. Then the pins 222 of the pin socket 221 may insert in the pin holes 423 of the pin socket 42 on the pin socket 221 of another case 2, and so on. Thus, a number of the computer devices can be connected with one another, in a stacked condition, saving space and reducing cost.

Figure 7:
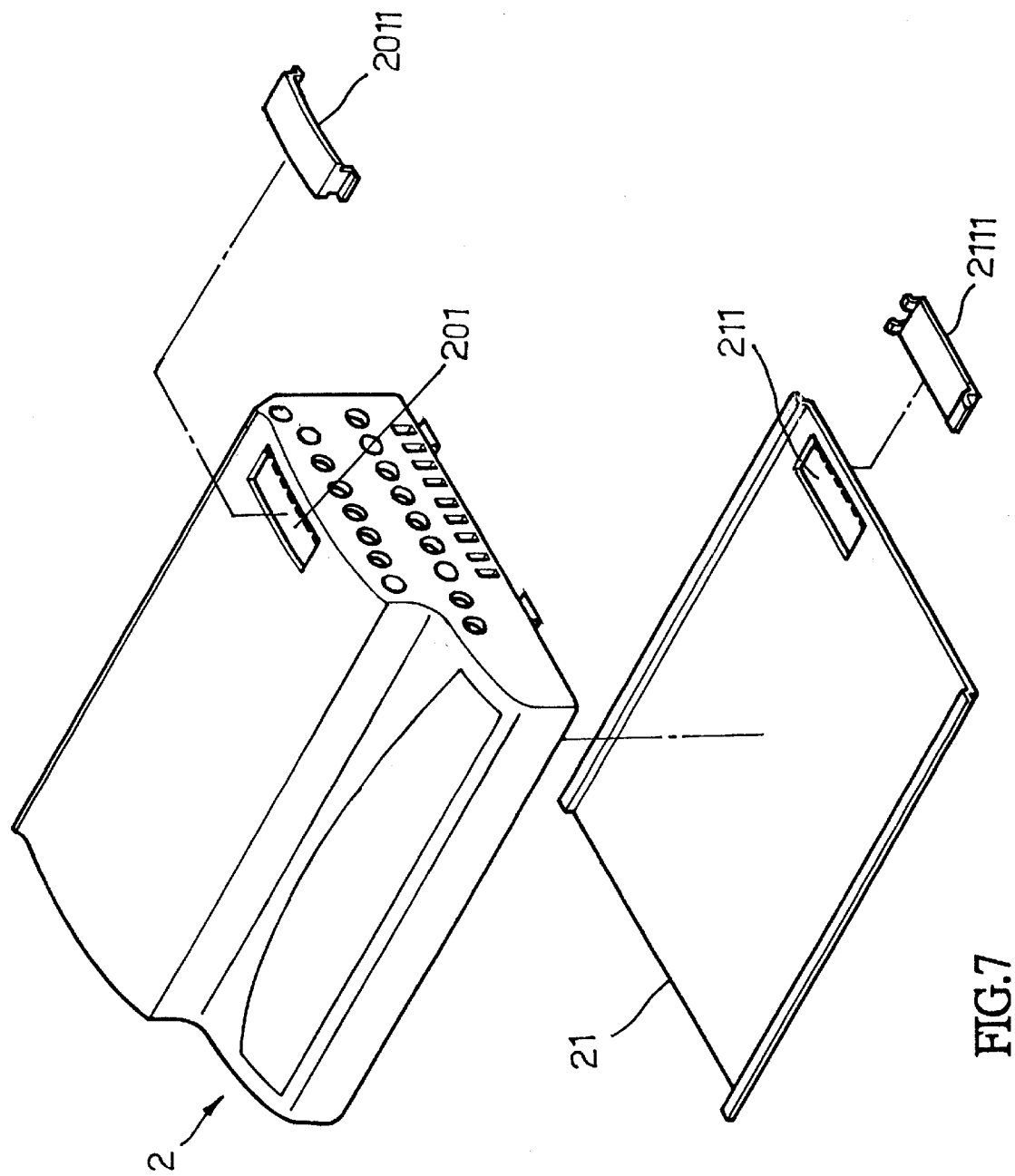
FIG. 7 is a perspective view of a dirt protection cover being in use in the present invention; and, FIG. 8 is a perspective view of a power supplier combined with a case in the present invention.

In case that a case 2 is only to be connected with another case under it, as shown in FIG. 7, a dirt prevention cover 2011 is provided to close up the upper hole 201. In the same way, if a case 2 is only to be connected with another case 2 on it, another dirt prevention cover 2111 is provided to close up the lower hole 211 for preventing insects, etc. for entering the case 2 to cause malfunctions of the computer device.

While the preferred embodiment of the invention has been described above, it will be recognized and understood that various modifications may be made therein and the appended claims are intended to cover all such modifications which may fall within the spirit and scope of the invention.

What is claimed is:

1. A system for structurally and electrically connecting a plurality of computer devices in a stacked relationship one above another and comprising:

a) a plurality of computer devices, each computer device having a case enclosing a circuit board with a pin receptacle and a pin group thereon, the case having first and second openings aligned with the pin receptacle and pin group, respectively, and opposite side portions;

b) a plurality of mounting holes in each of the opposite side portions of the case;

c) at least one connect plate having a first plurality of pins extending therefrom in engagement with the plurality of mounting holes in the side portion of one case, and a second plurality of pins extending therefrom in engagement with the plurality of mounting holes in the side portion of another case so as to structurally support one case above the other in a stacked relationship; and, d) a parallel pin receptacle connector extending through the first opening of one case and the second opening of another case having a plurality of pins on a first end engaging the circuit board pin receptacle in one case, and a plurality of pin holes on a second end engaged with the pin group of another case to electrically connect the circuit boards of cases arranged in a stacked relationship.

2. The system of claim 1 wherein each connect plate has a generally H-shaped configuration.

3. The system of claim 1 wherein the plurality of mounting holes in each of the opposite side portions of the case are arranged in two spaced apart rows.

4. The system of claim 1 further comprising mutually engaging racks on the case extending into the first and second holes, and on the parallel pin receptacle connector.

5. The system of claim 1 wherein the parallel pin receptacle connecter comprises a pair of U-shaped cover portions enclosing a pin socket having a plurality of spaced holes on one side and a plurality of pins extending from an opposite side.

6. The system of claim 5 further comprising a plurality of insulating strips extending from at least one of the U-shaped cover portions and located between adjacent ones of the plurality of pins extending from the pin socket.

7. The system of claim 5 wherein the plurality of pins extending from the pin socket are spaced apart so as to avoid signal interference.

8. The system of claim 5 further comprising a coating of lacquer on an outer surface of the U-shaped cover portions so as to prevent electric and magnetic interference.

9. The system of claim 1 further comprising a plurality of cooling holes located in opposite side portions of the case.

10. The system of claim 7 wherein the configuration of the plurality of cooling holes are different from the configurations of the plurality of mounting holes.

11. The system of claim 1 further comprising:

a) a plurality of dovetail projections extending from at least one case; and b) a power supply module having a plurality of dovetail grooves engaged by the plurality of dovetail projections so as to mount the at least one case on the power supply module.

* * * * *